United States Patent
Huang et al.

(10) Patent No.: US 11,766,731 B2
(45) Date of Patent: Sep. 26, 2023

(54) AUTOMATIC SOLDERING PROCESSING SYSTEM AND AUTOMATIC SOLDERING PROCESSING METHOD

(71) Applicant: Delta Electronics, Inc., Taoyuan (TW)

(72) Inventors: Cheng-Hao Huang, Taoyuan (TW); Kai-Sheng Chen, Taoyuan (TW); Bo-Ren Ciou, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 84 days.

(21) Appl. No.: 17/544,762

(22) Filed: Dec. 7, 2021

(65) Prior Publication Data
US 2023/0046823 A1 Feb. 16, 2023

(30) Foreign Application Priority Data
Aug. 12, 2021 (CN) .......................... 202110926078.6

(51) Int. Cl.
*B23K 3/00* (2006.01)
*B23K 3/08* (2006.01)
(Continued)

(52) U.S. Cl.
CPC .............. *B23K 3/08* (2013.01); *B23K 1/0016* (2013.01); *B23K 3/02* (2013.01); *B23K 2101/42* (2018.08)

(58) Field of Classification Search
CPC ........ B23K 1/0016; B23K 2101/36–42; B23K 3/00–087; B23K 31/02–125
(Continued)

(56) References Cited

U.S. PATENT DOCUMENTS

| 4,534,502 A | * | 8/1985 | Piurek | ................. H01L 31/0504 228/49.5 |
| 4,746,048 A | * | 5/1988 | Kawaguchi | .......... B23K 3/0615 29/850 |

(Continued)

FOREIGN PATENT DOCUMENTS

| CN | 103846517 A | * | 6/2014 | ............... B23K 3/00 |
| CN | 104384655 A | * | 3/2015 | ............. B23K 3/063 |

(Continued)

OTHER PUBLICATIONS

Office Action dated Feb. 8, 2022 of the corresponding Taiwan patent application No. 110129722.

*Primary Examiner* — Kiley S Stoner
(74) *Attorney, Agent, or Firm* — Chun-Ming Shih; HDLS IPR SERVICES

(57) ABSTRACT

An automatic soldering processing system is disclosed and includes a soldering-point information obtaining unit, a soldering-parameter generating unit, a solder feeding unit, an iron tip, a motion control unit, and a temperature control unit. The soldering-point information obtaining unit obtains an image of at least one soldering-point of an electronic product, the soldering-parameter generating unit generates soldering parameters such as solder feeding speed, solder feeding amount, moving speed, moving path, heating temperature and heating time for the at least one soldering-point correspondingly according to the image. The solder feeding unit feeds solder based on the solder feeding speed and the solder feeding amount, the iron tip performs a soldering action by using the solder, and the motion control unit and the temperature control unit control the iron tip according to the moving speed, the moving path, the heating temperature, and the heating time.

11 Claims, 8 Drawing Sheets

(51) Int. Cl.
*B23K 1/00* (2006.01)
*B23K 3/02* (2006.01)
*B23K 101/42* (2006.01)

(58) Field of Classification Search
USPC ............... 228/33, 41, 51–55, 179.1–180.22, 228/102–105
See application file for complete search history.

(56) References Cited

U.S. PATENT DOCUMENTS

| | | | | |
|---|---|---|---|---|
| 5,186,982 | A * | 2/1993 | Blette | B23K 1/0016 427/256 |
| 5,525,777 | A * | 6/1996 | Kukuljan | B23K 1/0056 219/121.65 |
| 6,744,003 | B1 * | 6/2004 | Ono | B23K 3/025 228/33 |
| 9,221,128 | B2 * | 12/2015 | Jeong | B23K 31/125 |
| 2014/0133738 | A1 * | 5/2014 | Jeong | G01N 21/95684 382/150 |
| 2015/0108202 | A1 * | 4/2015 | Deng | B23K 1/0016 228/7 |
| 2017/0173719 | A1 * | 6/2017 | Nguyen | B23K 3/033 |
| 2018/0290225 | A1 * | 10/2018 | Riegel | B23K 3/0638 |
| 2019/0217410 | A1 * | 7/2019 | Nguyen | B23K 3/0478 |
| 2019/0291217 | A1 * | 9/2019 | Wu | B23K 31/12 |
| 2019/0364668 | A1 * | 11/2019 | Nguyen | B23K 3/026 |
| 2020/0082278 | A1 * | 3/2020 | Wu | G06N 20/00 |

FOREIGN PATENT DOCUMENTS

| | | | | |
|---|---|---|---|---|
| CN | 104526101 | A * | 4/2015 | ............ B23K 3/04 |
| CN | 104551303 | A * | 4/2015 | ............ B23K 3/00 |
| CN | 104625290 | A * | 5/2015 | ............ B23K 3/02 |
| CN | 104668695 | A * | 6/2015 | ............ B23K 3/00 |
| CN | 105033394 | A * | 11/2015 | .......... B23K 3/0353 |
| CN | 105057838 | A * | 11/2015 | |
| CN | 105149719 | A * | 12/2015 | |
| CN | 105478950 | A * | 4/2016 | |
| CN | 105537714 | A * | 5/2016 | |
| CN | 105583490 | A * | 5/2016 | .......... B23K 3/0607 |
| CN | 105773016 | A * | 7/2016 | |
| CN | 106112175 | A * | 11/2016 | |
| CN | 106180946 | A * | 12/2016 | |
| CN | 106475649 | A * | 3/2017 | |
| CN | 106493448 | A * | 3/2017 | ............ B23K 3/08 |
| CN | 106964863 | A * | 7/2017 | |
| CN | 107096973 | A * | 8/2017 | ............ B23K 1/008 |
| CN | 107470734 | A * | 12/2017 | ............ B23K 3/063 |
| CN | 107999917 | A * | 5/2018 | |
| CN | 108015377 | A * | 5/2018 | ............ B23K 3/027 |
| CN | 108465964 | A * | 8/2018 | ........... B23K 31/02 |
| CN | 108838481 | A * | 11/2018 | |
| CN | 108838484 | A * | 11/2018 | |
| CN | 106334853 | B * | 12/2018 | .......... B23K 1/0016 |
| CN | 108941827 | A * | 12/2018 | |
| CN | 108941830 | A * | 12/2018 | |
| CN | 109047972 | A * | 12/2018 | |
| CN | 109108423 | A * | 1/2019 | |
| CN | 109396584 | A * | 3/2019 | .......... B23K 1/0008 |
| CN | 110000443 | A * | 7/2019 | ............ B23K 3/00 |
| CN | 110135123 | A * | 8/2019 | ........... B23K 31/12 |
| CN | 110270731 | A * | 9/2019 | ............ B23K 3/00 |
| CN | 110449684 | A * | 11/2019 | |
| CN | 110711915 | A * | 1/2020 | |
| CN | 111069728 | A * | 4/2020 | ............ B23K 3/00 |
| CN | 111112774 | A * | 5/2020 | |
| CN | 111112778 | A * | 5/2020 | |
| CN | 111112786 | A * | 5/2020 | ............ B23K 3/00 |
| CN | 111618388 | A * | 9/2020 | |
| CN | 109396584 | B | 10/2020 | |
| CN | 111992833 | A * | 11/2020 | .......... B23K 1/0056 |
| CN | 112207382 | A * | 1/2021 | |
| CN | 112427765 | A * | 3/2021 | ............ B23K 3/00 |
| CN | 112548258 | A * | 3/2021 | ............ B23K 3/00 |
| CN | 110961751 | B * | 4/2021 | .......... B23K 1/0056 |
| CN | 112620866 | A * | 4/2021 | |
| CN | 112935442 | A | 6/2021 | |
| CN | 111555093 | B * | 8/2021 | ............ B23K 1/08 |
| CN | 113579398 | A * | 11/2021 | |
| CN | 113618189 | A * | 11/2021 | |
| CN | 114535738 | A * | 5/2022 | |
| DE | 4140603 | A1 * | 6/1993 | .......... B23K 1/0056 |
| DE | 4314027 | A1 * | 11/1993 | .......... B23K 3/0473 |
| DE | 10102768 | A1 * | 7/2002 | ............ B23K 1/00 |
| DE | 202005019084 | U1 * | 4/2006 | ............ B23K 3/063 |
| DE | 102010023663 | A1 * | 12/2011 | ........... B23K 31/125 |
| EP | 1275461 | A1 * | 1/2003 | ............ B23K 3/087 |
| GB | 2233264 | A * | 1/1991 | ............ B23K 3/00 |
| JP | 3590319 | B2 * | 11/2004 | ............ B23K 1/012 |
| JP | 6517412 | B1 * | 5/2019 | ............ B23K 3/03 |
| KR | 20020082994 | A * | 11/2002 | |
| KR | 101622486 | B1 * | 5/2016 | |
| KR | 20180055589 | A * | 5/2018 | |
| KR | 20180055590 | A * | 5/2018 | |
| KR | 2018102925 | A * | 9/2018 | .......... B23K 1/0016 |
| KR | 100303130 | B1 * | 11/2020 | |
| KR | 20210018101 | A * | 2/2021 | |
| WO | WO-8901379 | A * | 2/1989 | .......... B23K 3/0615 |
| WO | WO-8901379 | A1 * | 2/1989 | |
| WO | WO-2017003372 | A1 * | 1/2017 | |
| WO | WO-2019117838 | A1 * | 6/2019 | .......... B23K 1/0008 |

* cited by examiner

AUTOMATIC SOLDERING PROCESSING SYSTEM AND AUTOMATIC SOLDERING PROCESSING METHOD

BACKGROUND OF THE DISCLOSURE

Technical Field

The present disclosure relates to a soldering processing field, and specifically relates to an automatic soldering processing system and an automatic soldering processing method.

Description of Related Art

Nowadays in production lines of electronic products, soldering stations that is used to assist operators to perform a manual soldering operation and automatic soldering systems that is used to perform an automatic soldering operation may be provided. The soldering stations and the automatic soldering systems usually use a machine to control soldering parameters such as a solder feeding amount, a solder feeding speed, a movement of an iron tip, a heating temperature, and heating time, etc., so as to implement a semi-automatic soldering operation or an automatic soldering operation on such production lines.

However, either the soldering stations or the automatic soldering systems are used on the production lines, different soldering points of different electronic products may need to be processed in accordance with different soldering parameters. The varied soldering parameters usually rely on the real experience of the operators, or be retrieved through a trial-and-error experiment. If the operators are unfamiliar with the soldering process, they may need to spend a lot of time to try for appropriate parameters.

Besides, the manufacturing trend of the production lines now is a small amount for numerous types, in other words, the product/product type produced by same production lines changes frequently. If the production lines frequently change the manufacturing product, the operators need to frequently change or tune the parameters used by the processing system. Therefore, the changeover time of the production lines may be delayed, and the processing rate of the production lines may be affected, which is unprofitable to the manufacturer.

SUMMARY OF THE DISCLOSURE

The present disclosure is directed to an automatic soldering processing system and an automatic soldering processing method, which may automatically generate relevant parameters needed for a soldering operation based on an image of an electronic product, and automatically accomplish the soldering operation in accordance with the generated parameters.

In one of the exemplary embodiments, the automatic soldering processing system of the present disclosure is used to process an electronic product having at least one soldering point, and includes:
- a solder feeding unit, providing a solder on the soldering point in accordance with a solder feeding speed and a solder feeding amount;
- an iron tip, executing a soldering action to the soldering point by using the solder; a motion control unit, connected with the iron tip, bringing the iron tip to move in accordance with a moving speed and a moving path;
- a temperature control unit, connected with the iron tip, controlling the iron tip to perform heating to execute the soldering action in accordance with a heating temperature and a heating time;
- a soldering-point information obtaining unit, obtaining a soldering-point image of the soldering point; and
- a soldering-parameter generating unit, connected with the solder feeding unit, the motion control unit, the temperature control unit and the soldering-point information obtaining unit, generating soldering-parameter sets for the soldering point based on the soldering-point image, wherein each of the soldering-parameter sets comprises the solder feeding speed, the solder feeding amount, the moving speed, the moving path, the heating temperature and the heating time.

In one of the exemplary embodiments, the automatic soldering processing method of the present disclosure is incorporated with the automatic soldering processing system as disclosed above, and includes following steps:
a) obtaining a soldering-point image of the soldering point;
b) generating soldering-parameter sets in accordance with the soldering-point image, wherein each of the soldering-parameter sets comprises a solder feeding speed, a solder speeding amount, a moving speed, a moving path, a heating temperature, and a heating time;
c) controlling a solder feeding unit of the automatic soldering processing system to feed a solder in accordance with the solder feeding speed and the solder feeding amount;
d) bringing an iron tip of the automatic soldering processing system to move in accordance with the moving speed and the moving path; and
e) controlling the iron tip to perform heating and execute a soldering action to the soldering point through the solder in accordance with the heating temperature and the heating time.

The present disclosure may automatically generate relevant parameters needed for a soldering operation based on an image of an electronic product to be processed. In comparison with related arts, the present disclosure may reduce the time cost of adjusting the parameters through the trial-and-error experiments. Therefore, the processing rate of the production lines may be increased, and the changeover time of the production lines for different products may be reduced.

DETAILED DESCRIPTION OF THE DISCLOSURE

In cooperation with the attached drawings, the technical contents and detailed description of the present disclosure are described hereinafter according to multiple embodiments, being not used to limit its executing scope. Any equivalent variation and modification made according to appended claims is all covered by the claims claimed by the present disclosure.

The present disclosure discloses an automatic soldering processing system (referred to as a soldering system hereinafter), the soldering system is arranged in a production line, and used to perform a soldering operation to multiple electronic products processed on the production line. Each of the electronic products has one or more soldering points thereon. The soldering system of the present disclosure may automatically generate one or more parameter sets needed for the soldering operation in accordance with an image of the one or more soldering points, and implement the soldering operation automatically based on the generated parameter set(s).

Figure 1:
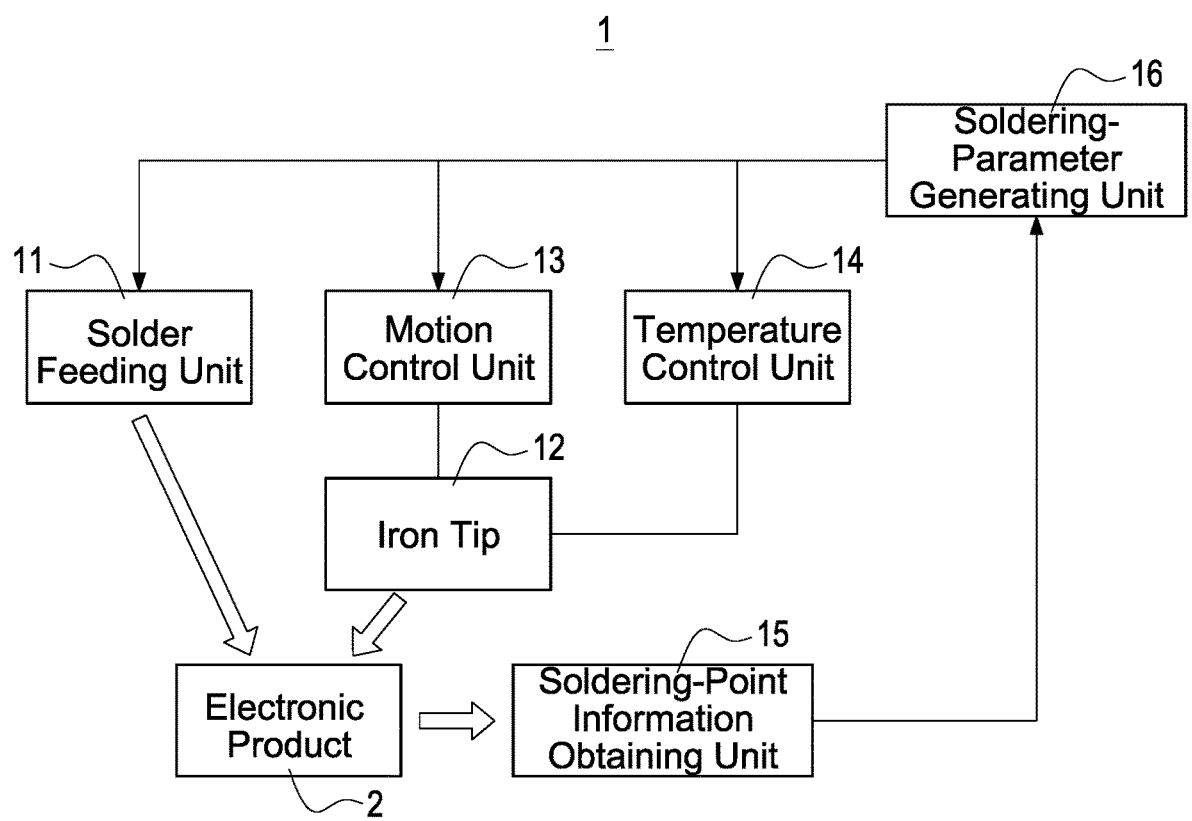
FIG. 1 is a block diagram of an automatic soldering processing system of a first embodiment according to the present disclosure.

Please refer to FIG. 1, FIG. 1 is a block diagram of an automatic soldering processing system of a first embodiment according to the present disclosure. As disclosed in FIG. 1, a soldering system 1 of the present disclosure includes a solder feeding unit 11, an iron tip 12, a motion control unit 13, a temperature control unit 14, a soldering-point information obtaining unit 15 and a soldering-parameter generating unit 16, wherein the soldering-parameter generating unit 16 is connected with the solder feeding unit 11, the motion control unit 13, the temperature control unit 14 and the soldering-point information obtaining unit 15, and the iron tip 12 is connected with the motion control unit 13 and the temperature control unit 14.

The solder feeding unit 11 may be, for example but not limited to, an automatic solder feeding machine, which is used to receive a control command of the soldering system 1 of designating a solder feeding speed and a solder feeding amount, and feed a solder onto each soldering point of an electronic product 2 based on the control command.

The iron tip 12 is directly or indirectly controlled by the motion control unit 13 and the temperature control unit 14, so as to heat the solder fed by the solder feeding unit 11 at each soldering point of the electronic product 2 to execute a soldering action respectively for each soldering point.

In one embodiment, the motion control unit 13 may be a controller that includes a robotic arm or a moving platform. The iron tip 12 is connected with the robotic arm or the moving platform, or directly arranged on the robotic arm or the moving platform.

In the embodiment, the motion control unit 13 may control the robotic arm or the moving platform to move based on a moving speed and a moving path received from the soldering-parameter generating unit 16, so as to bring the iron tip 12 to move while executing the soldering action.

The temperature control unit 14 may be a hardware unit implemented by a processor, or a software unit implemented by computer executable program codes executed with a processor, a computer, a server, etc. The temperature control unit 14 controls the iron tip 12 to perform heating based on a received heating temperature and a received heating time while the iron tip 12 executes the soldering action.

The soldering-point information obtaining unit 15 is used to obtain an image of one or more soldering points of the electronic product 2 (referred to as a soldering-point image hereinafter), so that the soldering system 1 may automatically generate, based on the soldering-point image, relevant parameter set(s) used to control the solder feeding unit 11 and the iron tip 12.

The electronic product 2 may be, for example but not limited to, a printed circuit board (PCB). In one embodiment, the soldering-point information obtaining unit 15 may be, for example but not limited to, an image sensor (such as a camera or a laser scanner) used to scan the one or more soldering points of the PCB to form the soldering-point image correspondingly. The soldering-point image may be a two-dimensional image or a three-dimensional image.

In another embodiment, the soldering-point information obtaining unit 15 may be, for example but not limited to, an image processor of a computer or a server, which is used to read out a CAD image file of the PCB. Therefore, the soldering-point information obtaining unit 15 may directly generate the soldering-point image based on the content of the CAD image file. The CAD image file may be a Gerber file, but not limited thereto.

The soldering-parameter generating unit 16 may be, for example but not limited to, a computer or a server having a processor. The soldering-parameter generating unit 16 is connected to the motion control unit 13 and the temperature control unit 14, and controls the iron tip 12 through the motion control unit 13 and the temperature control unit 14.

In one embodiment, the soldering-point information obtaining unit 15 may be implement by an image processor of the soldering-parameter generating unit 16, but not limited thereto.

One technical feature of the present disclosure is that, the soldering-parameter generating unit 16 may obtain the soldering-point image of the electronic product 2 from the soldering-point information obtaining unit 15, and perform an image analysis procedure to the soldering-point image to retrieve relevant information of the one or more soldering points of the electronic product 2, so as to generate soldering-parameter sets correspondingly. In one embodiment, each of the soldering-parameter sets respectively includes a solder feeding speed and a solder feeding amount being used to control the solder feeding unit 11, and each of the soldering-parameter sets respectively includes a moving speed, a moving path, a heating temperature and a heating time being used to control the iron tip 12.

Figure 2:
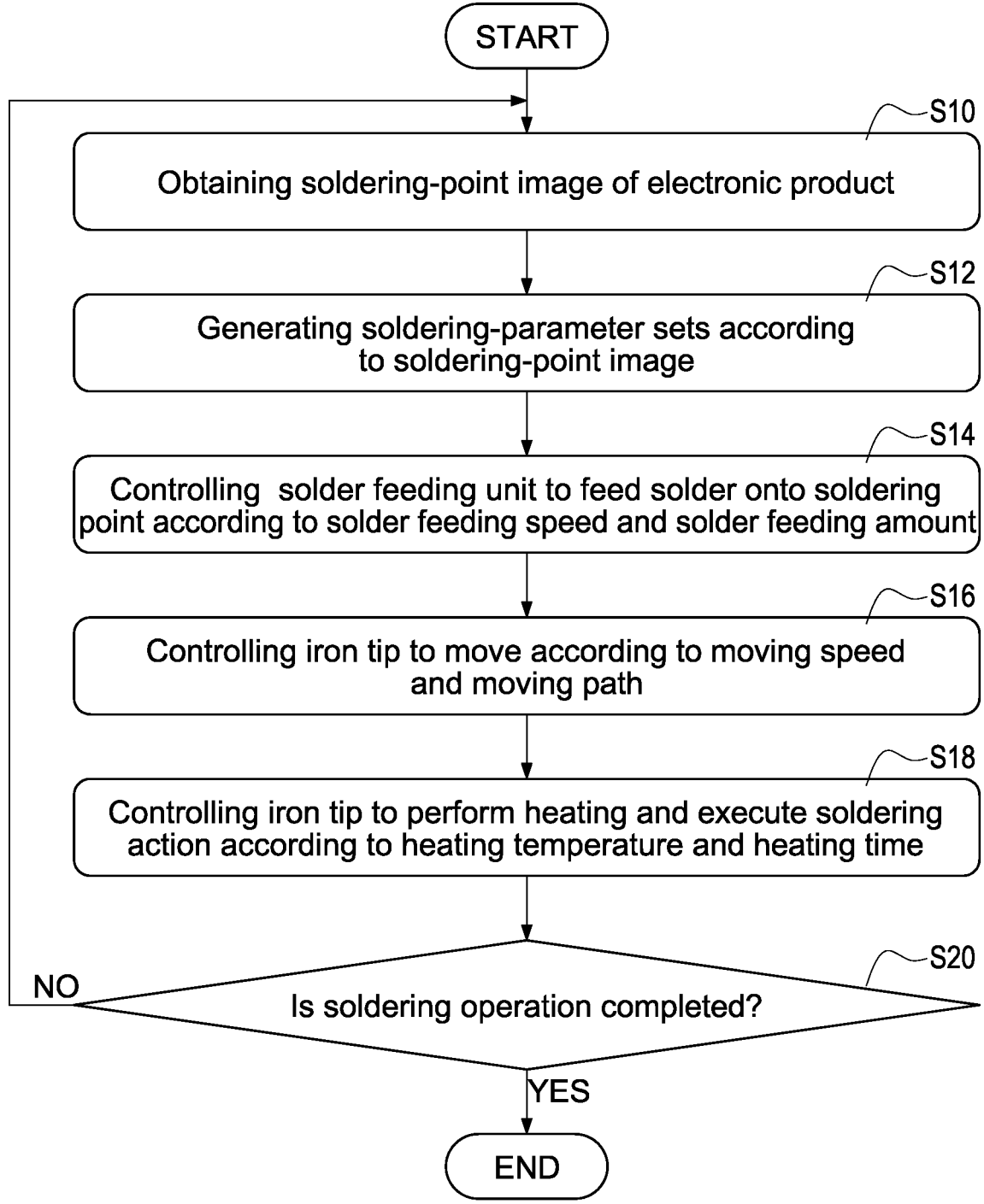
FIG. 2 is a flowchart of an automatic soldering processing method of a first embodiment according to the present disclosure.

Please refer to FIG. 1 and FIG. 2, wherein FIG. 2 is a flowchart of an automatic soldering processing method of a first embodiment according to the present disclosure.

FIG. 2 discloses an automatic soldering processing method (referred to as a soldering method hereinafter), the soldering method is incorporated with the soldering system 1 as disclosed in FIG. 1, so as to assist the soldering system 1 to implement an automatic soldering operation to electronic products 2.

First, the soldering system 1 obtains a soldering-point image of an electronic product 2 on a production line through the soldering-point information obtaining unit 15 (step S10), and performs an image analysis procedure to the obtained soldering-point image through the soldering-parameter generating unit 16 and generates soldering-parameter sets correspondingly according to an analysis result (step S12). As discussed above, each of the soldering-parameter sets at least includes the solder feeding speed, the solder feeding amount, the moving speed, the moving path, the heating temperature and the heating time.

As mentioned above, the soldering system 1 may generate the soldering-point image, in the step S10, by using an external image sensor or an internal image processor.

Figure 3A:
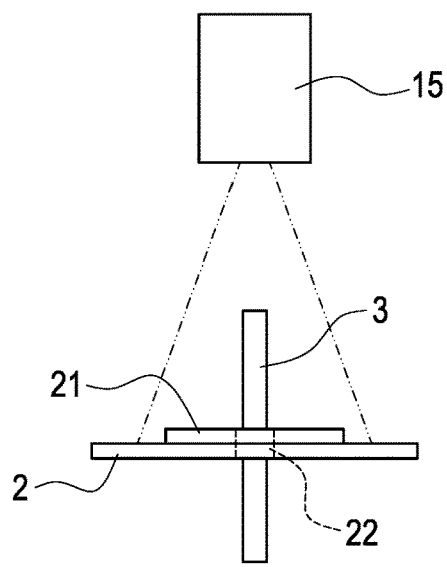
FIG. 3A is a schematic diagram of obtaining a soldering-point image of a first embodiment according to the present disclosure.
Figure 3B:
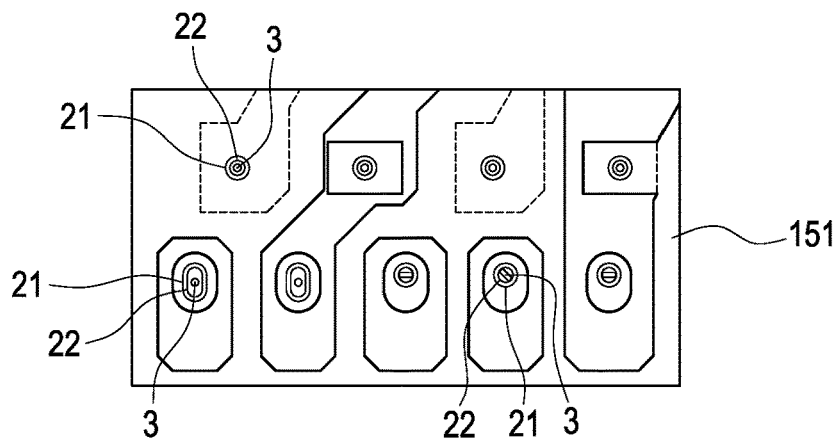
FIG. 3B is a schematic diagram of obtaining a soldering-point image of a second embodiment according to the present disclosure.

Please refer to FIG. 3A and FIG. 3B, wherein FIG. 3A is a schematic diagram of obtaining a soldering-point image of a first embodiment according to the present disclosure, FIG. 3B is a schematic diagram of obtaining a soldering-point image of a second embodiment according to the present disclosure.

In the embodiment of FIG. 3A, the soldering-point information obtaining unit 15 is a camera or a laser scanner. The soldering-point information obtaining unit 15 is arranged on a spot below or on top of an electronic product 2 being processed by the production line, and an image capturing range of the soldering-point information obtaining unit 15 covers images of multiple soldering points of the electronic product 2.

As shown in FIG. 3A, each of the soldering points of the electronic product 2 respectively includes a soldering pad 21 and a pin-through hole 22 used for a pin 3 of an electronic element to insert in. In the embodiment, the soldering-point image obtained by the soldering-point information obtaining unit 15 at least includes images of the soldering pad 21, the pin-through hole 22 and the pin 3 inserted in the pin-through hole 22. In the soldering method discussed above, the soldering-parameter generating unit 16 may generate the soldering-parameter sets in accordance with a first size, a first shape and a first direction of the soldering pad 21, a second size, a second shape and a second direction of the pin-through hole 22, and/or a third size, a third shape and a third direction of the pin 3.

In the embodiment of FIG. 3B, the soldering-point information obtaining unit 15 is an image processor. In this embodiment, the soldering-point information obtaining unit 15 may directly read out a CAD image file 151 of the electronic product 2 and generate a soldering-point image correspondingly based on the content of the CAD image file 151. Similarly, the soldering-point image generated by the soldering-point information obtaining unit 15 at least includes images of the soldering pad 21, a pin-through hole 22, and a pin 3 that corresponds to the pin-through hole 22 of multiple soldering points of the electronic product 2. In this embodiment, the soldering-parameter generating unit 16 may generate the soldering-parameter set for each soldering point in accordance with a first size, a first shape and a first direction of the soldering pad 21, a second size, a second shape and a second direction of the pin-through hole 22, and/or a third size, a third shape and a third direction of the pin 3 of each soldering point in the soldering-point image. In FIG. 3B, solid lines are used to represent a front contour of a circuit (also known as a pin side), and dotted lines are used to represent a back contour of the circuit (also known as a component side).

Please refer back to FIG. 2. After the step S12, the soldering-parameter generating unit 16 of the soldering system 1 controls the solder feeding unit 11 according to the solder feeding speed and the solder feeding amount, so that the solder feeding unit 11 feeds the solder onto each soldering point correspondingly (step S14).

On the other hand, the soldering-parameter generating unit 16 transmits the moving speed and the moving path to the motion control unit 13, so that the motion control unit 13 causes a movement of the iron tip 12 based on the moving speed and the moving path. For example, the motion control unit 13 controls the robotic arm or the moving platform to move based on the moving speed and the moving path, so that the iron tip 12 may relatively move to a corresponding position in accordance with the moving speed and the moving path. By doing this, the iron tip 12 may approach and leave each of the soldering points in a designated order to execute the soldering action (step S16). Besides, the soldering-parameter generating unit 16 transmits the heating temperature and the heating time to the temperature control unit 14, so that the temperature control unit 14 controls the iron tip 12 to perform heating based on the heating temperature and the heating time, so the iron tip 12 may execute the soldering action on each of the soldering points (step S18).

After the step S18, the soldering system 1 determines whether the soldering operation of the production line is completed (step S20). For example, the soldering system 1 determines whether the production line is powered off, or whether all of the soldering tasks are done. If the determination of the step S20 is negative (NO), the soldering system 1 re-executes the aforementioned steps to perform the soldering operation to next electronic product 2. If the determination of the step S20 is positive (YES), the soldering system 1 terminates the soldering operation.

In one embodiment, the soldering system 1 may re-execute the step S10 to the step S18 when the determination of the step S20 is negative. In doing so, the soldering system 1 obtains a soldering-point image of a next electronic product 2 to be processed, generates soldering-parameter sets correspondingly based on the re-obtained soldering-point image, and then performs the soldering operation to the next electronic product 2 in accordance with the re-generated soldering-parameter sets. Through re-obtaining the soldering-point image of the next electronic product 2 and re-generating the soldering-parameter sets corresponding to the re-obtained soldering-point image, the processing accuracy may be improved.

In another embodiment, the soldering system 1 may re-execute the step S14 to the step S18 when the determination of the step S20 is negative. In doing so, the soldering system 1 directly performs the soldering operation to a next electronic product 2 to be processed based on the previously used soldering-parameter sets. Through using the previously used soldering-parameter sets to perform the soldering operation to all of the electronic products 2 with same type, the processing efficiency may be improved.

Please refer to FIG. 4A to FIG. 4D, which are schematic diagrams respectively showing a soldering-point of a first embodiment, a second embodiment, a third embodiment and a fourth embodiment.

As discussed above, the electronic product 2 has one or more soldering points thereon, each of the soldering points respectively includes a soldering pad 21, the soldering pad 21 has a pin-through hole 22 for a pin 3 of an electronic component to insert to. When the iron tip 12 heats the solder and the heated solder sticks to the soldering pad 21, the soldering pad 21 and the pin 3 in the pin-through hole 22 may be joined together through the solder. As a result, the electronic element and the electronic product 2 are electrically connected with each other.

Figures 4A, 4B, 4C, 4D:
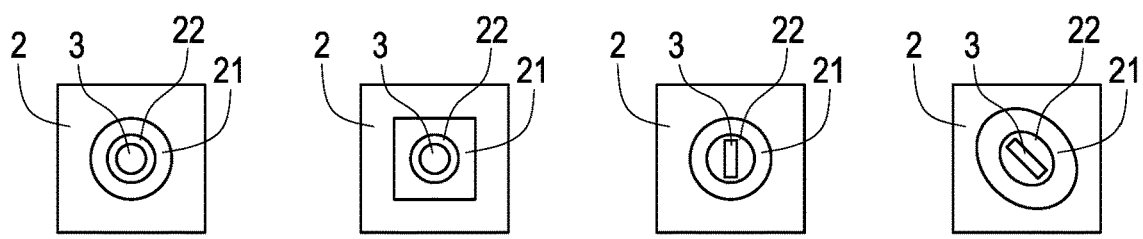
FIG. 4A is a schematic diagram showing a soldering-point of a first embodiment.
FIG. 4B is a schematic diagram showing a soldering-point of a second embodiment.
FIG. 4C is a schematic diagram showing a soldering-point of a third embodiment.
FIG. 4D is a schematic diagram showing a soldering-point of a fourth embodiment.

In the embodiment of FIG. 4A, the soldering point includes a round soldering pad 21 and a round pin-through hole 22 for a round pin 3 to insert to. In the embodiment of FIG. 4B, the soldering point includes a square soldering pad 21 and a round pin-through hole 22 for around pin 3 to insert to. In this embodiment, the pin-through hole 22 is inserted with a round pin 3, the iron tip 12 may approach and leave the pin-through hole 22 of the soldering point along any direction for an execution of the soldering action.

In the embodiment of FIG. 4C, the soldering point includes a round soldering pad 21 and a round pin-through hole 22 for a flat pin 3 to insert to. In the embodiment of FIG. 4D, the soldering point includes an oval soldering pad 21 and an oval pin-through hole 22 for a flat pin 3 to insert to. In this embodiment, the pin-through hole 22 is inserted with a flat pin 3, the iron tip 12 may approach and leave the pin-through hole 22 of the soldering point through a movement within a specific angle along one long edge of the flat pin 3, so as to execute the soldering action.

In another embodiment, the soldering pad 21 is an oval soldering pad and the pin 3 is a round pin, and the iron tip 12 may approach and leave the soldering point through a movement within a specific angle along a long axis of the oval soldering pad 21. For another example, the soldering pad 21 is a round soldering pad, the pin-through hole 22 is a round pin-through hole, and the pin 3 is a round pin, the iron tip 12 may approach and leave the soldering point through a movement along any direction, or along a moving direction that is same as the movement used for previous soldering point. However, the above description is only a part of the embodiments of the present disclosure, but not limited thereto.

It should be mentioned that, in order to achieve a better soldering effect, the soldering system 1 may preset a setting value. If an area of the soldering pad 21 of the soldering point is greater than or equal to the setting value, the motion control unit 13, when controlling the iron tip 12 to approach the soldering point, may control the iron tip 12 to directly locate on the pin-through hole 22. On the other hand, if an area of the soldering pad 21 of the soldering point is smaller than the setting value, the motion control unit 13, when controlling the iron tip 12 to approach the soldering point, may control the iron tip 12 to locate on the soldering pad 21.

However, the above description is only a part of the embodiments of the present disclosure, but not limited thereto.

Figure 5:
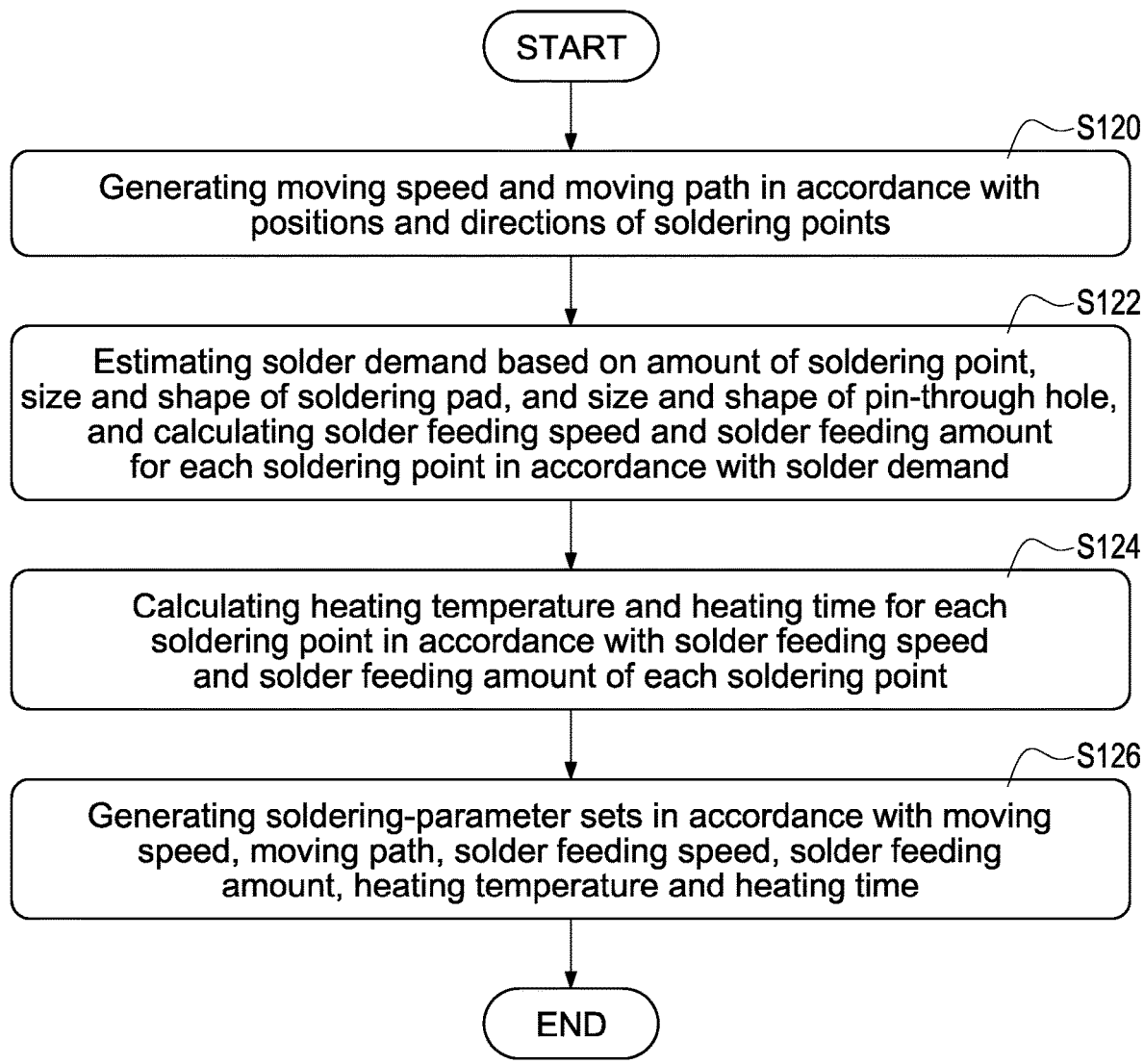
FIG. 5 is a flowchart of generating a soldering-parameter set of a first embodiment according to the present disclosure.

Please refer to FIG. 5, FIG. 5 is a flowchart of generating a soldering-parameter set of a first embodiment according to the present disclosure. FIG. 5 is used to interpret how the soldering-parameter generating unit 16 generates the soldering-parameter sets in accordance with the soldering-point image.

As shown in FIG. 5, after the soldering-point information obtaining unit 15 obtains the soldering-point image, the soldering-parameter generating unit 16 first generates a moving speed and a moving path correspondingly in accordance with positions and directions of multiple soldering points in the soldering-point image (step S120). In one embodiment, the moving speed indicates a speed of the iron tip 12 moving from a first soldering point to a second soldering point after the soldering action for the first soldering point is finished.

As disclosed above, if the pin-through hole 22 of the soldering point is inserted with a round pin 3, the iron tip 12 may approach and leave the pin-through hole 22 along any direction. In this embodiment, the moving path is related to an amount and a distributed positions of multiple soldering points of the electronic product 2. If the pin-through hole 22 of the soldering point is inserted with a flat pin 3, the iron tip 12 needs to approach and leave the pin-through hole 22 through a movement within a specific angle along one long edge of the flat pin 3. In this embodiment, the moving path is related to the amount and the distributed positions of the multiple soldering points of the electronic product 2, and is related to the shape and the direction of the pin 3 being inserted to the soldering point.

After the step S120, the soldering-parameter generating unit 16 estimates a solder demand based on an amount of the soldering points, a size and a shape of the soldering pad 21 of each soldering point, and a size and a shape of the pin-through hole 22 of each soldering point, and then calculates a solder feeding speed and a solder feeding amount for each soldering point in accordance with the solder demand (step S122).

After the step S122, the soldering-parameter generating unit 16 calculates a heating temperature and a heating time for each soldering point in accordance with the solder feeding speed and the solder feeding amount of each soldering point (step S124). After the step S124, the soldering-parameter generating unit 16 generates the soldering-parameter sets in accordance with the moving speed, the moving path, the solder feeding speed, the solder feeding amount, the heating temperature, and the heating time (step S126).

Figure 6:
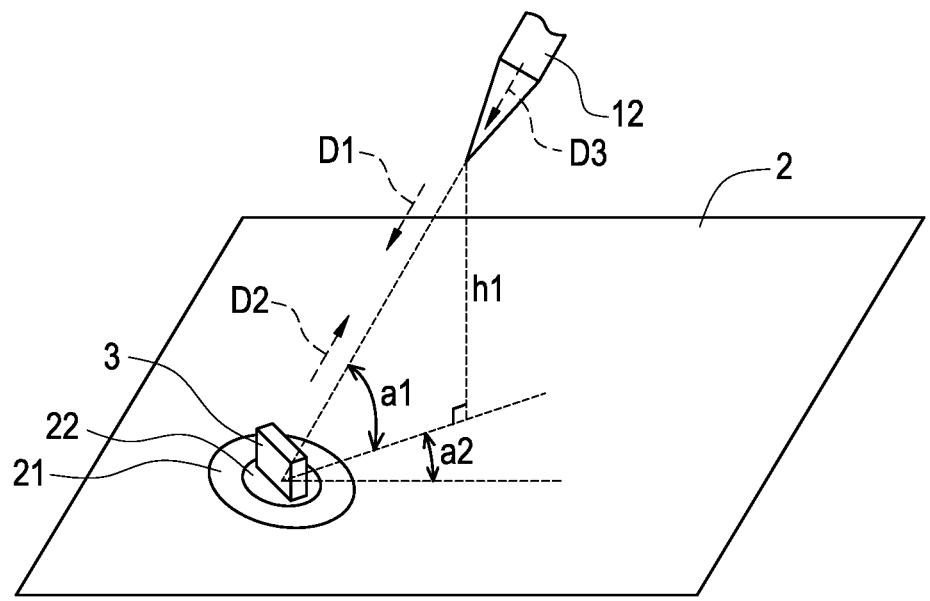
FIG. 6 is a schematic diagram of positioning an iron tip of a first embodiment according to the present disclosure.

Please refer to FIG. 6 at the same time, wherein FIG. 6 is a schematic diagram of positioning an iron tip of a first embodiment according to the present disclosure. In the step S120 of FIG. 5, the soldering-parameter generating unit 16 generates the moving path in accordance with the information of each soldering point of the electronic product 2 to be processed, wherein the generated moving path at least includes a positioning location of the iron tip 12 with respect to each soldering point. More specific, the positioning location indicates an approaching point of the iron tip 12 before approaching each soldering point, and a leaving point of the iron tip 12 after leaving each soldering point.

As disclosed in FIG. 6, the positioning location is decided based on an elevation angle a1, a height h1 and a direction angle a2 of the iron tip 12 with respect to each soldering point. In one embodiment, the soldering-parameter generating unit 16 sets a first set of positioning location (a1, h1, a2) for the iron tip 12 to perform an approaching movement (i.e., to move from the first set of positioning location toward the soldering point), and a second set of positioning location (a1, h1, a2) for the iron tip 12 to perform a leaving movement (i.e., to move away from the soldering point to the second set of positioning location).

The height a1 indicates a height of the positioning location of the iron tip 12 with respect to a surface of the electronic product 2. The elevation angle a1 indicates an angle of the positioning location of the iron tip 12 with respect to the soldering point in an elevation direction. In one embodiment, the elevation angle a1 is an angle greater than 0 degree and smaller than or equal to 90 degrees. The iron tip 12 performs the approaching movement and the leaving movement to approach and leave the soldering point based on a specific elevation angle a1. To be noted, the iron tip 12 approaches the soldering point by a straight down manner (from a top to a bottom) and leaves the soldering point by a straight up manner (from the bottom to the top) when the elevation angle a1 equals 90 degrees.

The direction angle a2 indicates an angle between the positioning location of the iron tip 12 and one side of the electronic product 2 in a horizontal direction. For example, the direction angle a2 may be an angle of the positioning location with respect to a direction along an x-axis of a plane coordinates of the electronic product 2. If the pin or the soldering pad of the soldering point is directional, the direction angle a2 of the iron tip 12 may be set according to a long edge of the pin or the soldering pad, so that the iron tip 12 may perform the approaching movement and the leaving movement to approach and leave the soldering point based on a specific direction (such as a direction vertical to the long edge of the pin or the soldering pad of the soldering point).

As disclosed in FIG. 6, the iron tip 12 performs the approaching movement to approach the soldering point from the first set of positioning location based on an approaching direction D1, and performs the leaving movement to leave the soldering point and go back to the second set of positioning location based on a leaving direction D2. It is worth saying that an iron direction D3 may be defined according to a direction pointed by a tip of the iron tip 12. In the embodiment, the iron direction D3 is basically same as the approaching direction D1, or has a specific angle with respect to the approaching direction D1.

Through generating the aforementioned moving path, the iron tip 12 may be prevented from colliding with the pin 3 of the electronic component (i.e., a component pin) to cause a damage when the soldering system 1 performs the soldering operation continuously to multiple soldering points of the electronic product 2.

Figure 7:
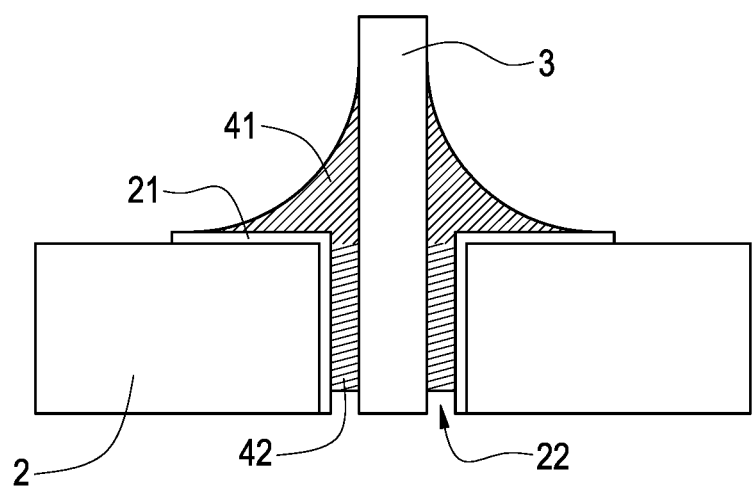
FIG. 7 is a schematic diagram showing a solder feeding amount of a first embodiment according to the present disclosure.

Please refer to FIG. 7, FIG. 7 is a schematic diagram showing a solder feeding amount of a first embodiment according to the present disclosure. In the step S122 of FIG. 5, the soldering-parameter generating unit 16 estimates the solder demand in accordance with the amount of the soldering points in the soldering-point image, the size and the shape of the soldering pad 21 of each soldering point, and the size and the shape of the pin-through hole 22 of each soldering point, and then the soldering-parameter generating unit 16 calculates the solder feeding speed and the solder feeding amount respectively for each soldering point in accordance with the solder demand.

As disclosed in FIG. 7, the solder demand for one soldering point includes a solder fillet 41 and a solder fill 42, wherein the solder fillet 41 indicates the solder that exposes as a normally concave surface out of the soldering point, and the solder fill 42 indicates the solder that is vertically filled in the pin-through hole 22.

In one embodiment, the soldering system 1 may preset a soldering area of a soldering part of each soldering point and a filled percentage of a fill part of each soldering point (such as 60%, 80%, 100%, etc.), and record such information as a setting file. In the step S122, the soldering-parameter generating unit 16 may inquire the setting file based on the amount of the soldering points, the size and the shape of the soldering pad 21 and the size and the shape of the pin-through hole 22, so as to obtain the corresponding solder demand respectively for each soldering point.

However, the above description is only one embodiment of the present disclosure, but not limited thereto.

In the above embodiment, the soldering system 1 first uses the soldering-parameter generating unit 16 to generate the soldering-parameter sets based on the soldering-point image, and then performs the soldering operation directly by using the soldering-parameter sets. However, the soldering-parameter sets used in the above embodiment may be initial parameter sets. In order to improve the processing accuracy, the soldering system 1 may optimize the initial parameter sets before performing the soldering operation.

Figure 8:
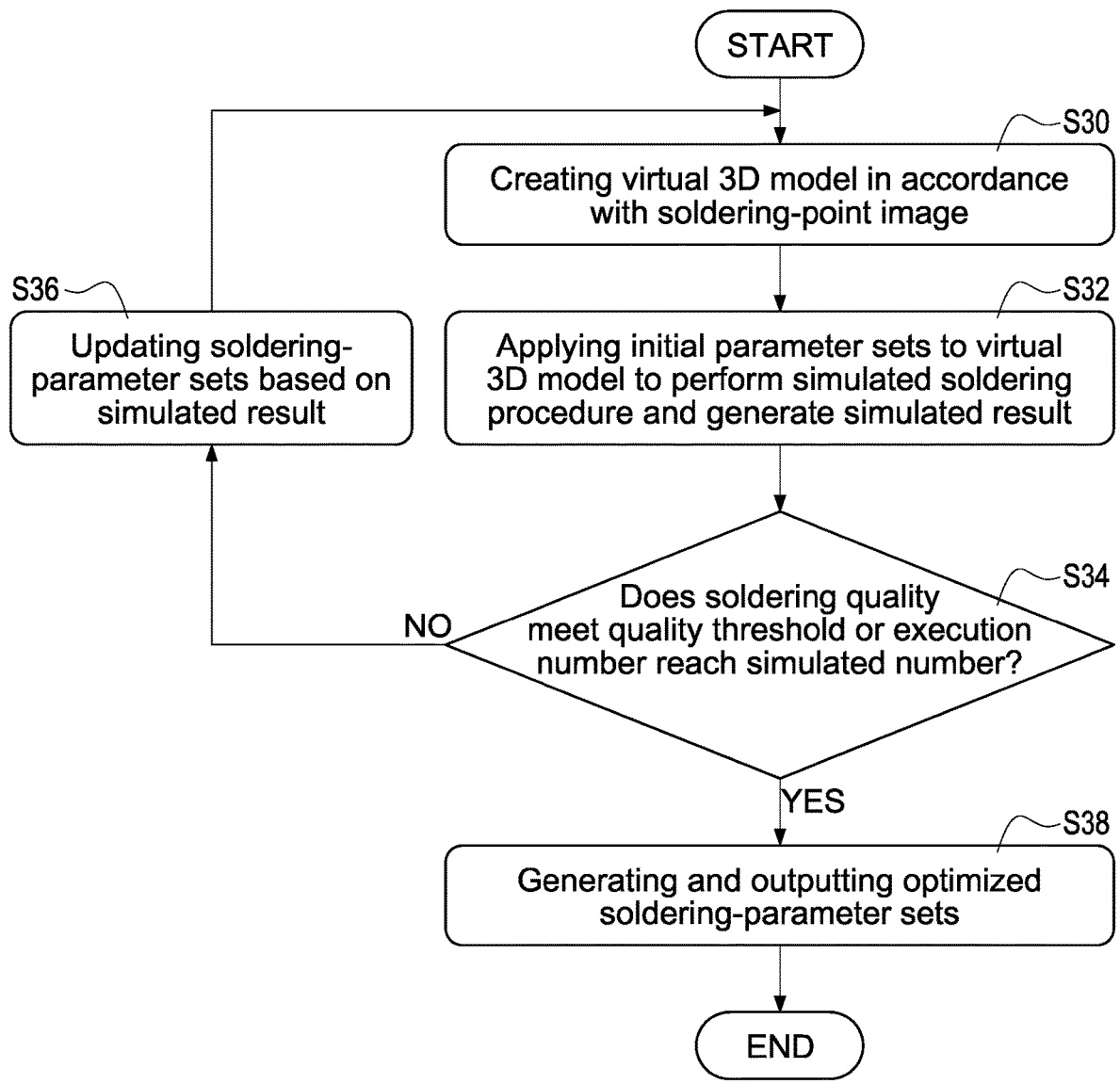
FIG. 8 is a flowchart of optimizing a soldering parameter of a first embodiment according to the present disclosure.

Please refer to FIG. 8, FIG. 8 is a flowchart of optimizing a soldering parameter of a first embodiment according to the present disclosure. As mentioned above, the soldering-parameter generating unit 16 may be a computer or a server having a processor. In this embodiment, the soldering-parameter generating unit 16 receives the soldering-point image of the electronic product 2, and then creates a virtual 3D model through an application program (not shown) in accordance with the soldering-point image (step S30). The virtual 3D model is created based on the content of the soldering-point image of the electronic product 2 to be processed, so the virtual 3D model has exactly same shape, same size, and same soldering points as the electronic product 2. Also, an amount, a size and a shape of the soldering points indicated by the virtual 3D model are same as that of the electronic product 2.

Next, the soldering-parameter generating unit 16 applies the initial parameter sets (i.e., the soldering-parameter sets generated in the step S12 of FIG. 2) to the application program, so that the application program may perform a simulated soldering procedure to the virtual 3D model and generate a simulated result correspondingly (step S32).

In this embodiment, the soldering-parameter generating unit 16 may preset a quality threshold needed for the production line, such as a number that the iron tip 12 touches the pin 3, an area of the solder fillet 41 of each soldering point, a filled percentage of the solder fill 42 of each soldering point, an amount of the solder exposed out of the soldering pad 21, etc. After the simulated soldering procedure completes for one time, the soldering-parameter generating unit 16 determines whether a soldering quality indicated by the simulated result meets the preset quality threshold or not, and determines whether an execution number of the simulated soldering procedure reaches a preset simulated number or not (step S34).

If the soldering quality of the simulated result does not meet the quality threshold and the execution number of the simulated soldering procedure does not reach the simulated number yet, the soldering-parameter generating unit 16 updates the soldering-parameter sets based on the simulated result (step S36), and re-executes the step S32 (i.e., executes a next simulated soldering procedure) in accordance with the updated soldering-parameter sets. In other words, the soldering-parameter generating unit 16 performs an iterative update to the soldering-parameter sets through performing the simulated soldering procedure for multiple times.

If the soldering quality of the simulated result meets the quality threshold, or the execution number of the simulated soldering procedure reaches the simulated number, the soldering-parameter generating unit 16 generates optimized soldering-parameter sets based on latest updated soldering-parameter sets, and outputs the optimized soldering-parameter sets (step S38). In particular, the optimized soldering-parameter sets includes a solder feeding speed, a solder feeding amount, a moving speed, a moving path, a heating temperature, and a heating time that are all updated. In one embodiment, the soldering-parameter generating unit 16 controls the solder feeding unit 11 and the iron tip 12 to implement the automatic soldering operation through using the optimized soldering-parameter sets, so that a higher processing accuracy may be achieved.

In the above embodiments, the soldering-parameter generating unit 16 generates the soldering-parameter sets correspondingly (including the initial parameter sets and the optimized soldering-parameter sets) based on the soldering-point image obtained by the soldering-point information obtaining unit 15. In another embodiment, the soldering system 1 may preset a type of soldering process used by the soldering operation, such as a point soldering process, a linear soldering process, etc., but not limited. In the embodiment, the soldering-parameter generating unit 16 may generate the soldering-parameter sets based on both of the soldering-point image and the type of soldering process used by the soldering system 1.

Figure 9:
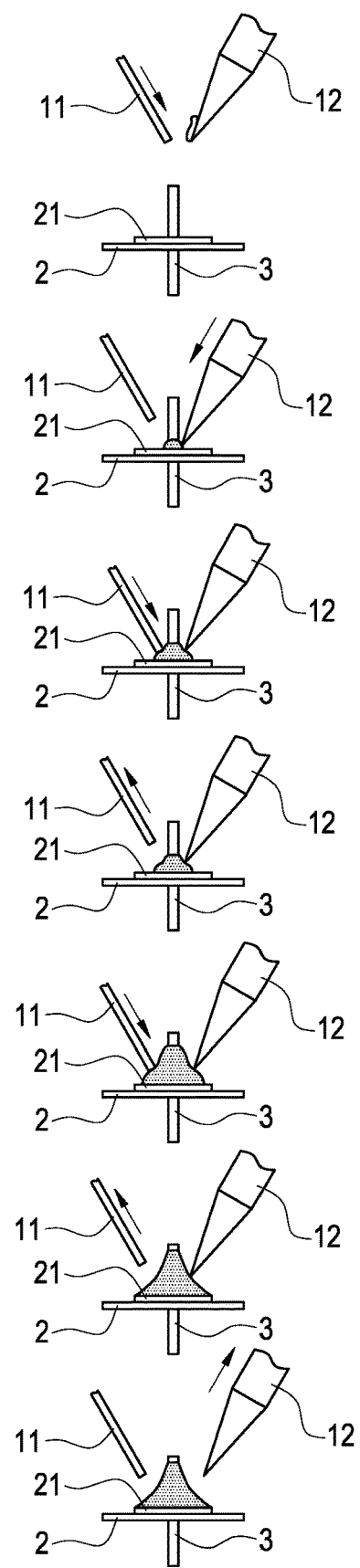
FIG. 9 is a schematic diagram of a soldering process of a first embodiment according to the present disclosure.

Please refer to FIG. 9, FIG. 9 is a schematic diagram of a soldering process of a first embodiment according to the present disclosure. FIG. 9 discloses an embodiment showing steps performed by the point soldering process.

In a first step as shown in FIG. 9, the iron tip 12 needs to stabilize its temperature, and the solder feeding unit 11 needs to pre-feed the solder onto the iron tip 12. In order to do so, the soldering-parameter sets of the first step relate to the heating temperature, the solder feeding speed and the solder feeding amount.

In a second step as shown in FIG. 9, the iron tip 12 approaches one soldering point of the electronic product 2 from a positioning location, and uses the solder on the iron tip 12 to directly perform the soldering action. In order to do so, the soldering-parameter sets of the second step relate to the moving path and the heating time (i.e., a time length of the iron tip 12 staying at the soldering point).

In a third step as shown in FIG. 9, the solder feeding unit 11 feeds the solder for the second time to increase the amount of the solder on the soldering point. In order to do so, the soldering-parameter sets of the third step relate at least to the solder feeding speed and the solder feeding amount.

In a fourth step, the solder feeding unit 11 retrieves the solder, and the iron tip 12 keeps heating the solder on the soldering point. In order to do so, the soldering-parameter sets of the fourth step relate at least to the heating time.

In a fifth step as shown in FIG. 9, the solder feeding unit 11 feeds the solder for the third time to increase the amount of the solder on the soldering point. In order to do so, the soldering-parameter sets of the fifth step relate at least to the solder feeding speed and the solder feeding amount.

In a sixth step as shown in FIG. 9, the solder feeding unit 11 retrieves the solder, and the iron tip 12 keeps heating the solder on the soldering point. In order to do so, the soldering-parameter sets of the sixth step relate at least to the heating time.

In a seventh step as shown in FIG. 9, the iron tip 12 finishes its heating action, and leaves the soldering point and moves back to the positioning location. In order to do so, the soldering-parameter sets relate at least to the moving path (i.e., at least includes the positioning location and a moving direction of the iron tip 12).

The above description is provided to interpret the relationship between the point soldering process and the soldering-parameter sets. However, the point soldering process may be implemented through different manners, it is not limited only to the steps and order as described in FIG. 9.

Figure 10:
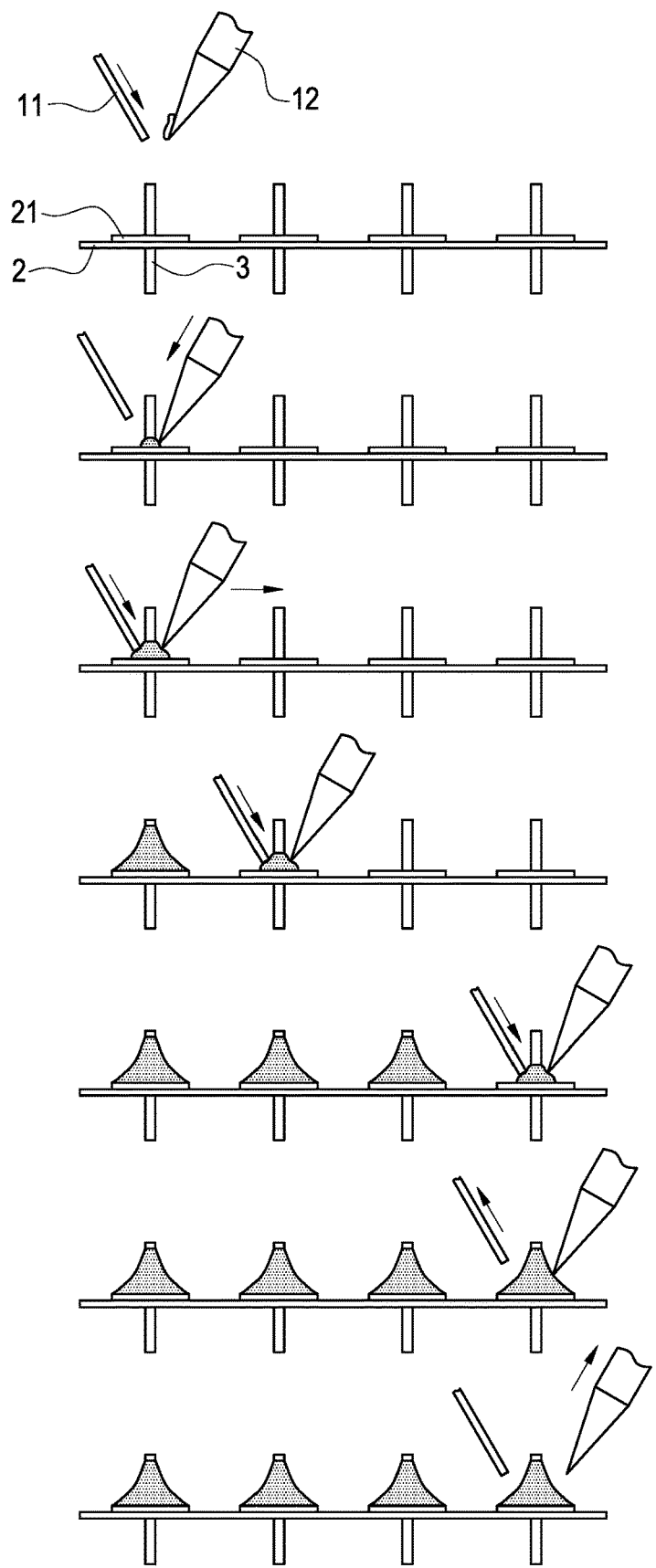
FIG. 10 is a schematic diagram of a soldering process of a second embodiment according to the present disclosure.

Please refer to FIG. 10, FIG. 10 is a schematic diagram of a soldering process of a second embodiment according to the present disclosure. FIG. 10 discloses an embodiment showing steps performed by the linear soldering process.

In a first step as shown in FIG. 10, the iron tip 12 needs to stabilize its temperature, and the solder feeding unit 11 needs to pre-feed the solder onto the iron tip 12. In order to do so, the soldering-parameter sets of the first step relate to the heating temperature, the solder feeding speed and the solder feeding amount.

In a second step as shown in FIG. 10, the iron tip 12 approaches a first soldering point of the electronic product 2 from a positioning location, and uses the solder on the iron tip 12 to directly perform the soldering action. In order to do so, the soldering-parameter sets of the second step relate at least to the moving path and the heating time (i.e., a time length of the iron tip 12 staying at the first soldering point).

In a third step, a fourth step and a fifth step as shown in FIG. 10, the iron tip 12 moves continuously among multiple soldering points, and the solder feeding unit 11 feeds the solder continuously for the multiple soldering points along with the movement of the iron tip 12. In order to do so, the soldering-parameter sets of the third step, the fourth step and the fifth step relate at least to the solder feeding speed, the solder feeding amount, and the moving speed (i.e., a speed of the iron tip 12 moving among the multiple soldering points).

In a sixth step as shown in FIG. 10, the solder feeding unit 11 retrieves the solder, and the iron tip 12 keeps heating the solder of a latest soldering point. In order to do so, the soldering-parameter sets of the sixth step relate at least to the heating time.

In a seventh step as shown in FIG. 10, the iron tip 12 finishes its heating action, and leaves the soldering point and moves back to the positioning location. In order to do so, the soldering-parameter sets of the seventh step relate at least to the moving path (i.e., at least includes the positioning location and a moving direction of the iron tip 12).

The above description is provided to interpret the relationship between the linear soldering process and the soldering-parameter sets. However, the linear soldering process may be implemented through different manners, it is not limited only to the steps and order as described in FIG. 10.

Through using the technical solution provided by the present disclosure, the operators of the production lines may generate the parameters needed for the automatic soldering operation based on the image of the electronic product to be processed.

Therefore, the time cost of adjusting the parameters through trial-and-error experiments may be reduced, the processing rate of the production lines may be increased, and the changeover time of the production lines in changing the processed product may be reduced.

As the skilled person will appreciate, various changes and modifications can be made to the described embodiment. It is intended to include all such variations, modifications and equivalents which fall within the scope of the present disclosure, as defined in the accompanying claims.

What is claimed is:

1. An automatic soldering processing system, used to process an electronic product having at least one soldering point, comprising:
   a solder feeding unit, providing a solder on the soldering point in accordance with a solder feeding speed and a solder feeding amount;
   an iron tip, executing a soldering action to the soldering point by using the solder;
   a motion control unit, connected with the iron tip, bringing the iron tip to move in accordance with a moving speed and a moving path;
   a temperature control unit, connected with the iron tip, controlling the iron tip to perform heating to execute the soldering action in accordance with a heating temperature and a heating time;

a soldering-point information obtaining unit, obtaining a soldering-point image of the soldering point, wherein the electronic product is a printed circuit board (PCB), the soldering point comprises a soldering pad and a pin-through hole for being inserted by a component pin, the soldering-point image comprises images of the soldering pad, the pin-through hole, and the component pin; and a soldering-parameter generating unit, connected with the solder feeding unit, the motion control unit, the temperature control unit and the soldering-point information obtaining unit, generating soldering-parameter sets for the soldering point in accordance with at least one of a first size, a first shape, and a first direction of the soldering pad, a second size, a second shape, and a second direction of the pin-through hole, and a third size, a third shape, and a third direction of the component pin of the soldering-point image, wherein each of the soldering-parameter sets comprises the solder feeding speed, the solder feeding amount, the moving speed, the moving path, the heating temperature and the heating time;

wherein the soldering-parameter generating unit is configured to create a virtual 3D model in accordance with the soldering-point image, apply the soldering-parameter sets to the virtual 3D model to perform an iterative simulation soldering procedure to update the soldering-parameter sets and generate optimized soldering-parameter sets, wherein the solder feeding unit, the iron tip, the motion control unit, and the temperature control unit are configured to control the solder feeding unit and the iron tip in accordance with the optimized soldering-parameter sets.

2. The automatic soldering processing system in claim 1, wherein the soldering-point information obtaining unit is an image sensor, the image sensor is configured to sense the soldering point of the PCB to generate the soldering-point image.

3. The automatic soldering processing system in claim 1, wherein the soldering-point information obtaining system is an image processor, the image processor is configured to read out a CAD image file of the PCB to generate the soldering-point image.

4. The automatic soldering processing system in claim 1, wherein the moving path comprises at least one positioning location of the iron tip with respect to the soldering point, the positioning location is decided based on an elevation angle, a height and a direction angle of the iron tip with respect to the soldering point, wherein the elevation angle is an angle of the positioning location with respect to the soldering point in an elevation direction, the height is a height of the positioning location with respect to a surface of the electronic product, the direction angle is an angle between the positioning location and one side of the electronic product in a horizontal direction.

5. The automatic soldering processing system in claim 1, wherein the soldering-parameter generating unit is configured to generate the soldering-parameter sets in accordance with the soldering-point image and a type of soldering process used by the automatic soldering processing system, wherein the type of soldering process is a point soldering process or a linear soldering process.

6. An automatic soldering processing method, incorporated with an automatic soldering processing system to process an electronic product with at least one soldering point, comprising:

a) obtaining a soldering-point image of the soldering point, wherein the electronic product is a PCB, the soldering point comprises a soldering pad and a pin-through hole for being inserted by a component pin, the soldering-point image comprises images of the soldering pad, the pin-through hole, and the component pin;

b) generating soldering-parameter sets in accordance with at least one of a first size, a first shape, and a first direction of the soldering pad, a second size, a second shape, and a second direction of the pin-through hole, and a third size, a third shape, and a third direction of the component pin of the soldering-point image, wherein each of the soldering-parameter sets comprises a solder feeding speed, a solder feeding amount, a moving speed, a moving path, a heating temperature, and a heating time, b11) creating a virtual 3D model in accordance with the soldering-point image;

b12) applying the soldering-parameter sets to the virtual 3D model to perform a simulation soldering procedure and generate a simulated result;

b13) before a soldering quality indicated by the simulated result meets a preset quality threshold and an execution number of the simulation soldering procedure reaches a simulated number, updating the soldering-parameter sets according to the simulated result and re-executing the step b12);

b14) when the soldering quality meets the preset quality threshold or the execution number of the simulation soldering procedure reaches the simulated number, generating an optimized soldering-parameter sets in accordance with the simulated result;

c) controlling a solder feeding unit of the automatic soldering processing system to feed a solder in accordance with the solder feeding speed and the solder feeding amount of the optimized soldering-parameter sets;

d) bringing an iron tip of the automatic soldering processing system to move in accordance with the moving speed and the moving path of the optimized soldering-parameter sets; and e) controlling the iron tip to perform heating and execute a soldering action to the soldering point through the solder in accordance with the heating temperature and the heating time of the optimized soldering-parameter sets.

7. The automatic soldering processing method in claim 6, wherein the soldering-point information obtaining unit is an image sensor, the step a) comprises controlling the image sensor to sense the soldering point to generate the soldering-point image.

8. The automatic soldering processing method in claim 6, wherein the soldering-point information obtaining unit is an image processor, the step a) comprises controlling the image processor to read out a CAD image file of the electronic product to generate the soldering-point image.

9. The automatic soldering processing method in claim 6, wherein the step b) comprises:

b1) generating the moving speed and the moving path according to a position and a direction of the soldering point;

b2) estimating a solder demand based on an amount of the soldering point, a first size and a first shape of the soldering pad, and a second size and a second shape of the pin-through hole;

b3) generating the solder feeding speed and the solder feeding amount for the soldering point in accordance with the solder demand;

b4) generating the heating temperature and the heating time in accordance with the solder feeding speed and the solder feeding amount; and b5) generating the solder-parameter sets in accordance with the moving speed, the moving path, the solder feeding speed, the solder feeding amount, the heating temperature, and the heating time.

10. The automatic soldering processing method in claim 6, wherein the moving path comprises at least one positioning location of the iron tip with respect to the soldering point, the positioning location is decided based on an elevation angle, a height and a direction angle of the iron tip with respect to the soldering point, wherein the elevation angle is an angle of the positioning location with respect to the soldering point in an elevation direction, the height is a height of the positioning location with respect to a surface of the electronic product, the direction angle is an angle between the positioning location and one side of the electronic product in a horizontal direction.

11. The automatic soldering processing method in claim 6, wherein the step b) comprises generating the soldering-parameter sets by the soldering-parameter generating unit in accordance with the soldering-point image and a type of soldering process used by the automatic soldering processing system, wherein the type of soldering process is a point soldering process or a linear soldering process.

* * * * *